United States Patent
Shimizu et al.

(10) Patent No.: US 7,138,194 B2
(45) Date of Patent: Nov. 21, 2006

(54) MAGNETIC RECORDING MEDIUM, METHOD OF MANUFACTURE THEREFOR, AND MAGNETIC READ/WRITE APPARATUS

(75) Inventors: Kenji Shimizu, Ichihara (JP); Akira Sakawaki, Ichihara (JP); Hiroshi Sakai, Ichihara (JP); Takashi Hikosaka, Tokyo (JP); Soichi Oikawa, Chiba (JP)

(73) Assignees: Showa Denko K.K., Tokyo (JP); Kabushiki Kaisha Toshiba, Tokyo (JP)

( * ) Notice: Subject to any disclaimer, the term of this patent is extended or adjusted under 35 U.S.C. 154(b) by 109 days.

(21) Appl. No.: 10/630,796

(22) Filed: Jul. 31, 2003

(65) Prior Publication Data
US 2004/0023074 A1 Feb. 5, 2004

Related U.S. Application Data

(60) Provisional application No. 60/401,038, filed on Aug. 6, 2002.

(30) Foreign Application Priority Data
Aug. 1, 2002 (JP) .............................. 2002-224790

(51) Int. Cl.
G11B 5/66 (2006.01)
G11B 5/70 (2006.01)

(52) U.S. Cl. ................ 428/828; 428/832; 427/131
(58) Field of Classification Search ............ 427/131; 428/694 TS, 694 TM, 336, 611, 667, 900, 428/827, 828, 831, 831.2, 832
See application file for complete search history.

(56) References Cited

U.S. PATENT DOCUMENTS

| 5,815,342 | A | 9/1998 | Akiyama et al. |
| 6,403,203 | B1 | 6/2002 | Futamoto et al. |
| 6,524,724 | B1* | 2/2003 | Cheng et al. ............. 428/611 |
| 6,537,638 | B1* | 3/2003 | Do et al. ................. 428/65.3 |
| 6,670,055 | B1* | 12/2003 | Tomiyasu et al. ...... 428/694 TS |
| 6,723,457 | B1* | 4/2004 | Tanahashi et al. ... 428/694 TM |
| 2004/0013909 | A1 | 1/2004 | Shimizu et al. |

* cited by examiner

Primary Examiner—Holly Rickman
(74) Attorney, Agent, or Firm—Sughrue Mion, PLLC (57) ABSTRACT

The magnetic recording medium comprises a soft magnetic undercoat film, an orientation control film that controls the orientation of a film provided directly above, a perpendicular magnetic film of which axis of easy magnetization is generally oriented perpendicular to a non-magnetic substrate, and a protective film, that are provided on the non-magnetic substrate, wherein the orientation control film is made of a Co alloy which contains one or more elements selected from Ti, V, Sr, Y, Nb, Mo, Hf, Ta, Ni and W.

15 Claims, 4 Drawing Sheets

MAGNETIC RECORDING MEDIUM, METHOD OF MANUFACTURE THEREFOR, AND MAGNETIC READ/WRITE APPARATUS

CROSS-REFERENCE TO RELATED APPLICATION

This application claims the benefit pursuant to 35 U.S.C. §119(e)(1) of U.S. Provisional Application, No. 60/401,038 filed Aug. 6, 2002.

BACKGROUND OF THE INVENTION

1. Field of the invention

The present invention relates to a magnetic recording medium, a method of manufacture therefor, and a magnetic read/write apparatus that uses the magnetic recording medium.

2. Description of the Related Art

Recording densities of hard disk device (HDD) as a kind of a magnetic read/write apparatus has recently increased by at least 60% per year, and it is believed that this trend will continue in future. Therefore, magnetic heads and magnetic recording media suitable for high recording density have been developed.

A commercially available magnetic recording medium mounted in the magnetic read/write apparatus is mostly an in-plane magnetic recording medium wherein the axis of easy magnetization in a magnetic film is generally oriented parallel to the substrate. The axis of easy magnetization refers to a direction to which spontaneous magnetization is stably directs, and refers to the direction of the c axis of an hcp structure in the case of a Co alloy.

In the in-plane magnetic recording medium, there is a possibility that the volume per bit of the magnetic film becomes too small when the recording density is increased and magnetic read/write characteristics are deteriorated by thermal fluctuation effects. Also medium noise increases under the influence of a demagnetizing field in the boundary of recording bits when the recording density is increased.

In a so-called perpendicular magnetic recording medium of which the axis of easy magnetization in the magnetic film is generally oriented perpendicular to a substrate, in contrast, recording magnetic domains that have clear boundaries can be formed due to less influence of a demagnetizing field in the boundary of recording bits even when the recording density is increased, and therefore noise can be reduced. Moreover, since the recording density can be increased even if the volume of bits is relatively large, the perpendicular magnetic recording medium has high thermal stability, resulting in much attention being directed to the perpendicular magnetic recording medium. Consequently, a structure of a medium suitable for use in perpendicular magnetic recording has been proposed.

Recently, there has been increasing demand for high-density recording in magnetic recording media. For this reason, it is proposed to use a single pole type head that has high level of writing ability in the perpendicular magnetic film.

To cope with the single pole type head, such a magnetic recording medium has been proposed as a layer made of a soft magnetic material, called a backing layer, provided between a perpendicular magnetic film and a substrate so as to improve the efficiency of the flow of the magnetic flux between the single pole type head and the magnetic recording medium.

As the perpendicular magnetic recording medium, for example, there is widely used a perpendicular magnetic recording medium comprising a backing layer (soft magnetic undercoat film), an orientation control film that enables the axis of easy magnetization of the perpendicular magnetic recording film to orient perpendicularly, a perpendicular magnetic film made of a Co alloy, and a protective film, that are provided on a substrate.

However, even when the backing layer is provided, the magnetic recording medium does not have satisfactory performance in read/write characteristics, and therefore a magnetic recording medium that is better in read/write characteristics has been required.

As a means for improving the read/write characteristics of the magnetic recording medium, it is proposed to use a low noise magnetic material as the perpendicular magnetic film.

Also, some means for improvement are proposed with resect to the structure of the perpendicular magnetic film.

Japanese Patent No. 2669529 proposes to enhance lattice matching properties between a Ti alloy undercoat film and a hexagonal magnetic alloy film and to improve the orientation of the c axis of the hexagonal magnetic alloy film by introducing other elements into the Ti in the Ti alloy undercoat film.

However, when using a Ti alloy undercoat film, exchange coupling in the magnetic alloy film increases and medium noise increases, thereby making it difficult to further increase the recording density.

Japanese Patent Application, First Publication No. Hei 8-180360 proposes to improve the orientation of the c axis of a perpendicular magnetic alloy film by providing an undercoat film comprising Co and Ru between a perpendicular magnetic alloy made of a Co alloy and a substrate.

However, in this magnetic recording medium, the crystal grain diameter of the undercoat film comprising Co and Ru increases. As a result, the magnetic grain diameter in the perpendicular magnetic recording film increases and the medium noise increase, thereby making it difficult to further increase the recording density.

Japanese Patent Application, First Publication No. Sho 63-211117 proposes to provide a carbon-containing undercoat film between a perpendicular magnetic recording film made of a Co alloy and a substrate.

However, when using the carbon-containing undercoat film, the orientation of the c axis of the perpendicular magnetic film deteriorates and the thermal stability deteriorates, thereby making it difficult to further increase the recording density.

BRIEF SUMMARY OF THE INVENTION

Under the above-described circumstances., the present invention has been made, and objects thereof are to provide a magnetic recording medium by which it is possible to read and write information at a higher density by improving the read/write characteristics, a method of manufacture therefor, and a magnetic read/write apparatus.

The magnetic recording medium of the present invention comprises at least a soft magnetic undercoat film, an orientation control film that controls the orientation of a film provided directly above, a perpendicular magnetic film of which axis of easy magnetization is generally oriented perpendicular to a non-magnetic substrate, and a protective film, that are provided on the non-magnetic substrate, wherein the orientation control film is made of a Co alloy which contains one or more selected from Ti, V, Sr, Y, Nb, Mo, Hf, Ta, Ni and W.

The Co content of the orientation control film is preferably at least 20 at % and not more than 85 at %.

The orientation control film is preferably made of a Co alloy containing W.

Saturation magnetization Ms of the orientation control film is preferably equal to or less than 200 emu/cc.

The thickness of the orientation control film is preferably at least 0.5 nm and equal to or less than 20 nm.

The orientation control film preferably has an amorphous structure or a fine crystal structure.

An intermediate film made of a material containing at least Co and Cr is preferably provided between the orientation control film and the perpendicular magnetic film.

The intermediate film is preferably made of a CoCrPtB alloy.

The intermediate film and/or the perpendicular magnetic film may have an initial growth portion having an amorphous structure (bottom layer portion).

The intermediate film may have a construction such that the thickness of the initial growth portion of the intermediate film having an amorphous structure is equal to or less than 1 nm.

The perpendicular magnetic film is preferably made of a material containing at least Co and Pt.

The method of manufacturing a magnetic recording medium of the present invention comprises forming at least a soft magnetic undercoat film, an orientation control film that controls the orientation of a film provided directly above, a perpendicular magnetic film of which the axis of easy magnetization is generally oriented perpendicular to a non-magnetic substrate, and a protective film, on the non-magnetic substrate, wherein the orientation control film is made of a Co alloy which contains one or more selected from Ti, V, Sr, Y, Nb, Mo, Hf, Ta, Ni and W.

The magnetic read/write apparatus of the present invention comprises a magnetic recording medium and a magnetic head that reads and writes information on the magnetic recording medium, wherein the magnetic head is a single pole type head, and the magnetic recording medium comprises at least a soft magnetic undercoat film, an orientation control film that controls the orientation of a film provided directly above, a perpendicular magnetic film of which axis of easy magnetization is generally oriented perpendicular to a non-magnetic substrate, and a protective film, that are provided on the non-magnetic substrate, the orientation control film being made of a Co alloy which contains one or more selected from Ti, V, Sr, Y, Nb, Mo, Hf, Ta, Ni and W.

In the magnetic recording medium of the present invention, since the orientation control film is made of a Co alloy which contains one or more elements selected from Ti, V, Sr, Y, Nb, Mo, Hf, Ta, Ni and W, it is made possible to reduce noise and to improve read/write characteristics.

Therefore, it is made possible to read and write information at a higher density.

A negative nucleation field will be described below.

Figure 2:
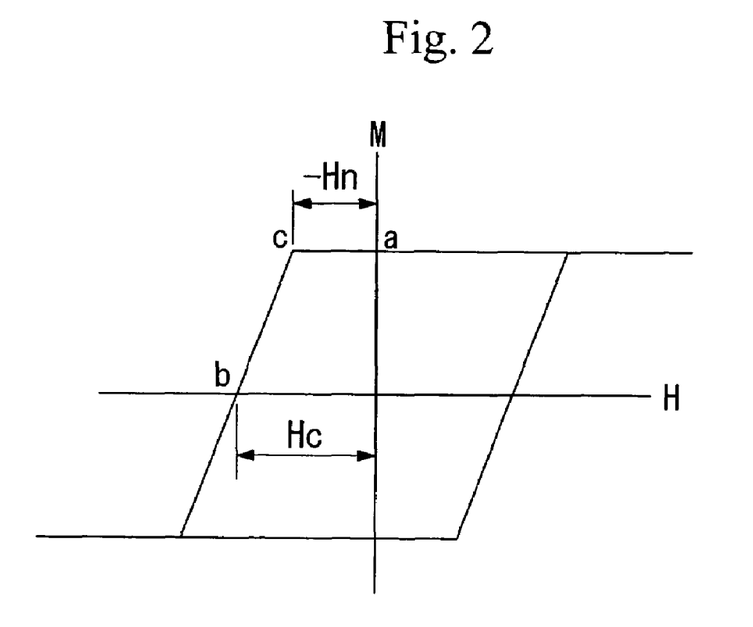
FIG. 2 is a graph showing a method of measuring a negative nucleation field (−Hn).

As shown in FIG. 2, the negative nucleation field (−Hn) can be represented by the distance (Oe) between the axis Y (axis M) and the point "c" in a MH curve determined by a vibrating sample magnetometer (VSM), where the point "a" is a point at which the external magnetic field becomes 0 in the process of decreasing the external magnetic field from a saturated state of the magnetization, the point "b" is a point at which the magnetization becomes 0, and the point "c" is a point of intersection of a tangent which touches the MH curve at the point "b" and a line which shows saturation magnetization.

Figure 3:
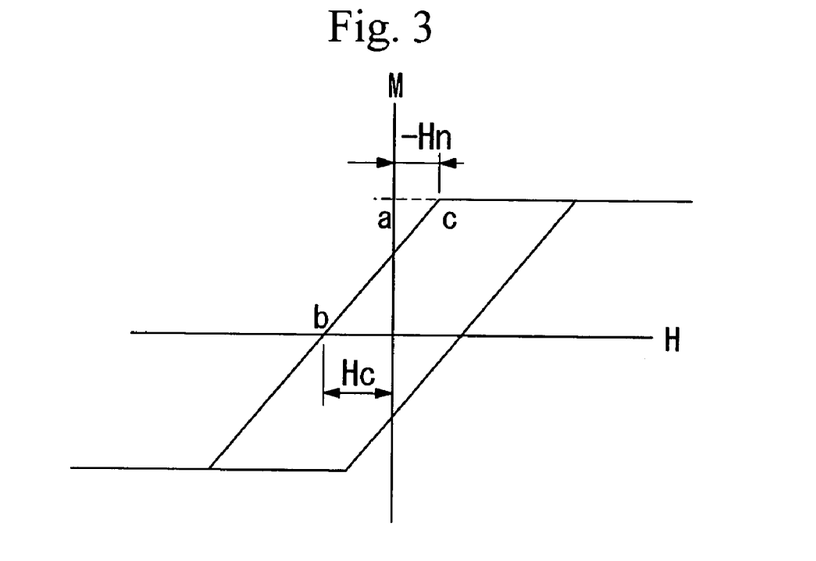
FIG. 3 is a graph showing a method of measuring a negative nucleation field (−Hn).

Moreover, the negative nucleation field (−Hn) takes a positive value in the case in which the point "c" is in a region in which the external magnetic field becomes negative (see FIG. 2), and conversely, takes a negative value in the case in which the point "c" is in a region in which the external magnetic field becomes positive (see FIG. 3).

Next, a method of measuring variance of a coercive force follow.

Variance of a coercive force can be determined by a VSM or a Kerr effect measuring device.

Figure 4:
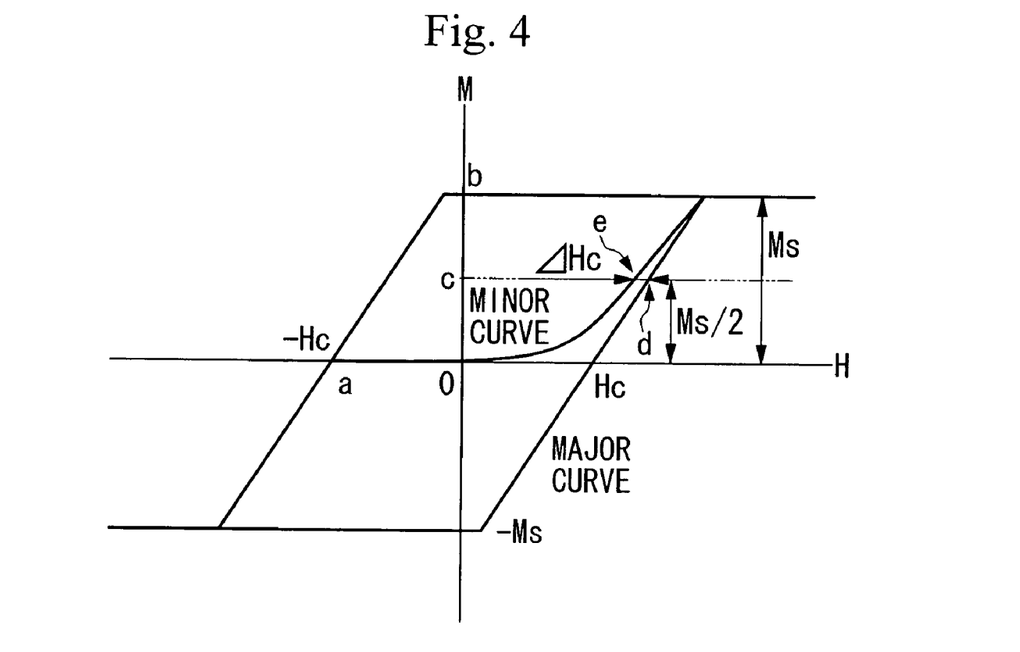
FIG. 4 is a graph showing a method of measuring of ΔHc/Hc.

As shown in FIG. 4, a MH curve of a medium is determined by a conventional technique. The resulting curve is taken as the major curve.

Then, an external magnetic field is decreased from the state wherein magnetization is saturated and, after changing the sweeping direction of the external magnetic field at the point "a" at which M becomes 0, the external magnetic field is increased until magnetization is saturated again. The curve thus obtained is taken as the minor curve. The point, at which the external magnetic field becomes 0 in the process of decreasing the external magnetic field from the state wherein magnetization is saturated, is referred to as the point "b".

ΔHc is a difference between the point "d" and the point "e" where the point "d" is the point of intersection of major curve and a parallel line obtained by drawing a line parallel to the axis H from the point "c" as a midpoint of the point "b" and the origin, and the point "e" is the point of intersection of the minor curve and said parallel line. ΔHc is divided by Hc of the medium to obtain variance of a coercive force (ΔHc/Hc).

There is a correlation between the variance of a coercive force (ΔHc/Hc) and resolution during reading/writing.

The thickness of the film can be determined by observing the cross section of the medium using a transmission electron microscope (TEM).

DETAILED DESCRIPTION OF THE INVENTION

Figure 1:
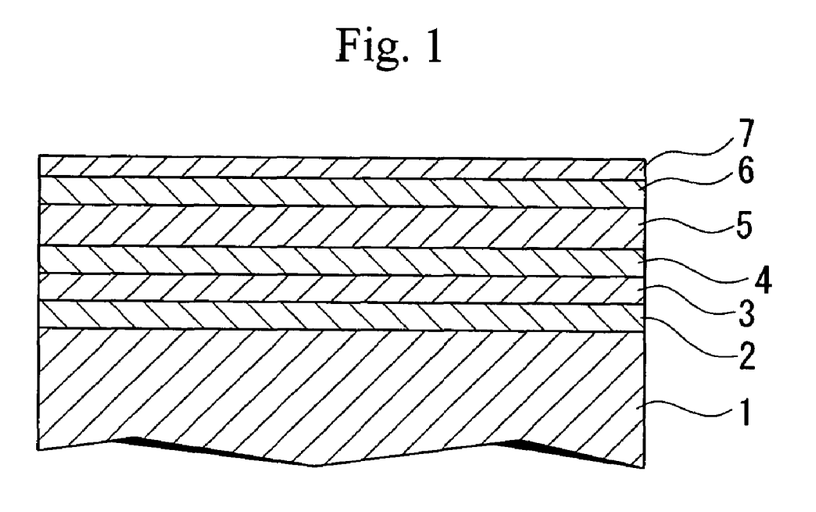
FIG. 1 is a partial sectional view showing the first embodiment of a magnetic recording medium of the present invention.

FIG. 1 shows the first embodiment of the magnetic recording medium of the present invention.

The magnetic recording medium shown here has a structure in which a soft magnetic undercoat film 2, an orientation control film 3, an intermediate film 4, a perpendicular magnetic recording film 5, a protective film 6 and a lubrication film 7 are formed on a non-magnetic substrate 1.

As the non-magnetic substrate 1, a metallic substrate comprising a metallic material such as aluminum or an aluminum alloy may be used, and a non-metallic substrate comprising a non-metallic material such as glass, ceramic, silicon, silicon carbide or carbon may be used.

Examples of the glass substrate include amorphous glass substrate and crystallized glass substrate.

As the amorphous glass, general-purpose soda-lime glass, and aluminosilicate glass can be used. As the crystallized glass, lithium-based crystallized glass can be used.

As the ceramic substrate, a sintered body containing general-purpose aluminum oxide, aluminum nitride or silicon nitride as the major constituent, or fiber-reinforced products thereof can be used.

As the non-magnetic substrate 1, there can also be used substrates wherein the NiP film or NiP alloy film is formed on said metallic or non-metallic substrate by a plating method, a sputtering method, or the like.

To increase the recording density, the mean surface roughness Ra of the substrate 1 is preferably controlled to 2 nm (20 Å) or less, and preferably 1 nm or less because a flying height of a magnetic head can be decreased.

To increase the recording density, a minute waviness (Wa) of the surface of the substrate 1 is preferably controlled to 0.3 nm or less, and preferably 0.25 nm or less because a flying height of a magnetic head can be decreased.

The minute waviness (Wa) can be measured in terms of a surface mean roughness at a measuring range of 80 μm using a surface roughness measuring device P-12 (manufactured by KLA-Tencor Co.).

In view of flying stability of the magnetic head, it is preferable to use those wherein the surface mean roughness Ra of at least one of the edge portion and the side portion of the chamfer portion is 10 nm or less, and preferably 9.5 nm or less.

The soft magnetic undercoat film 2 is provided in order to increase the component perpendicular to the substrate of the magnetic flux from the magnetic head and to establish more firmly the magnetization of the perpendicular magnetic recording film 5, that records the information (in a direction perpendicular to the substrate 1). This action becomes more remarkable when using a single pole type head for perpendicular recording as a read/write magnetic head.

The soft magnetic undercoat film 2 is made of a soft magnetic material. As the material thereof, a material containing one or more materials selected from among Fe, Ni and Co can be used.

Examples of the material include FeCo alloys (FeCo, FeCoV and the like), FeNi alloys (FeNi, FeNiMo, FeNiCr, FeNiSi and the like), FeAl alloys (FeAl, FeAlSi, FeAlSiCr, FeAlSiTiRu, FeAlO and the like), FeCr alloys (FeCr, FeCrTi, FeCrCu and the like), FeTa alloys (FeTa, FeTaC, FeTaN and the like), FeMg alloys (FeMgO and the like), FeZr alloys (FeZrN and the like), FeC alloys, FeN alloys, FeSi alloys, FeP alloys, FeNb alloys, FeHf alloys, and FeB alloys.

There can also be used a material having an Fe content that is at least 60 at % composed of microcrystals comprising FeAlO, FeMgO, FeTaN, FeZrN or the like. In addition, it can also have a granular structure in which the microcrystals are dispersed in a matrix.

As the material of the soft magnetic undercoat film 2, a Co alloy, which contains at least 80 at % of Co and also contains one or more selected from Zr, Nb, Ta, Cr, Mo or the like, can be used.

Examples of preferable material include CoZr, CoZrNb, CoZrTa, CoZrCr, and CoZrMo alloys.

As the material, those having an amorphous structure can be used.

The coercive force Hc of the soft magnetic undercoat film 2 is preferably equal to or less than 100 (Oe) (preferably equal to or less than 20 (Oe)).

The coercive force Hc of higher than the above range is not preferable by the following reason. That is, soft magnetic characteristics become insufficient and the read back wave does not become a so-called rectangular wave, but is instead distorted wave.

Bs·t, that is, the product of the saturation magnetic density Bs of the material that forms the soft magnetic undercoat film 2 and the thickness t of the soft magnetic undercoat film 2, is preferably at least 40 T·nm (more preferably at least 60 T·nm).

A Bs·t that is less than the above range is not preferable for the following reason. That is, the read back wave is sometimes distorted and overwrite (OW) characteristics deteriorate.

At the outermost surface (top surface side) of the soft magnetic undercoat film 2, an oxidized layer that the material constituting the soft magnetic undercoat film 2 is oxidized is preferably formed.

Consequently, magnetic fluctuation of the surface of the soft magnetic undercoat film 2 can be suppressed and, therefore, read/write characteristics of the magnetic recording medium can be improved by reducing noise caused by the magnetic fluctuation.

Also read/write characteristics can be improved by refining crystal grains of the orientation control film 3 formed on the soft magnetic undercoat film 2.

The orientation control film 3 is a film provided for controlling the orientation and crystal grain diameter of the intermediate film 4 provided directly thereabove and/or the perpendicular magnetic recording film 5.

The orientation control film 3 is made of a Co alloy containing one or more selected from Ti, V, Sr, Y, Nb, Mo, Hf, Ta, Ni and W.

It is particularly preferable that the orientation control film be made of a Co alloy containing W.

The Co content of the orientation control film 3 is preferably at least 20 at % and equal to or less than 85 at % (particularly at least 25 at % and equal to or less than 70 at %). Particularly excellent read/write characteristics can be obtained by controlling the Co content within the above range.

Saturation magnetization Ms of the orientation control film 3 is preferably equal to or less than 200 emu/cc. When Ms of the orientation control film 3 exceeds 200 emu/cc, read/write characteristics deteriorate due to noise generated from the orientation control film 3.

The thickness of the orientation control film 3 is preferably at least 0.5 nm and equal to or less than 20 nm (preferably from 1 to 12 nm, and more preferably from 1 to 8 nm).

When the thickness of the orientation control film 3 is within the above range, the perpendicular orientation of the perpendicular magnetic recording film 5 becomes particularly higher and the distance between the magnetic head and the soft magnetic undercoat film 2 becomes small during reading and writing, and therefore read/write characteristics can be enhanced without deteriorating the resolution of the read back signal.

When the thickness falls below the above range, the perpendicular orientation of the perpendicular magnetic recording film 5 is reduced, and therefore read/write characteristics and the thermal stability deteriorate.

When the thickness exceeds the above range, the perpendicular orientation of the perpendicular magnetic recording film 5 is reduced, and therefore read/write characteristics and the thermal stability deteriorate. Since the distance between the magnetic head and the soft magnetic undercoat film 2 becomes large during reading and writing, the resolution of the read back signal decreases and the read back output deteriorate, which is not preferable.

The orientation control film 3 preferably has an amorphous structure or a fine crystal structure.

Due to the amorphous structure or fine crystal structure of the orientation control film 3, the orientation of the intermediate film 4 provided directly above and/or the perpendicular magnetic recording film 5 is improved, thereby making it possible to make the crystal grains finer.

The crystal structure of the orientation control film 3 can be confirmed, for example, by an X-ray diffraction method or transmission electron microscopy (TEM).

Since the surface profile of the orientation control film 3 exerts an influence on the surface profiles of the perpendicular magnetic film 5 and protective film 6, the mean surface roughness Ra of the orientation control film 3 is preferably set to 2 nm or less in order to reduce the surface unevenness of the magnetic recording medium.

Control of the mean surface roughness Ra to 2 nm or less makes it possible to reduce the surface unevenness of the magnetic recording medium, thereby to sufficiently lower the flying height of the magnetic head during reading and writing and to enhance the recording density.

It is preferable that the intermediate film 4 be made of a material containing at least Co and Cr.

It is preferably to use, as the material of the intermediate film 4, a material having a hcp structure. It is preferable to use, as the material of the intermediate film 4, a CoCr alloy, a CoCrX$_1$ alloy or a CoX$_1$ alloy (X$_1$: one or more selected from Pt, Ta, Zr, Ru, Nb, Cu, Re, Ni, Mn, Ge, Si, O, N and B).

The Co content of the intermediate film 4 is preferably from 30 to 70 at %.

Among these materials, a CoCrPtB alloy is preferable.

The thickness of the intermediate film 4 is preferably set to 30 nm or less (preferably 20 nm or less) in order to prevent deterioration of read/write characteristics due to coarsening of magnetic grains in the perpendicular magnetic recording film 5 and lowering of the resolution of recording due to an increase in distance between the magnetic head and the soft magnetic undercoat film 2.

Since the perpendicular orientation of the perpendicular magnetic recording film 5 can be enhanced by providing the intermediate film 4, it is made possible to enhance the coercive force of the perpendicular magnetic recording film 5 and to further improve the read/write characteristics and thermal stability.

The perpendicular magnetic recording film 5 is a film of which axis of easy magnetization is generally oriented perpendicular to the substrate, and is preferably made of a material containing at least Co and Pt.

Particularly preferably, the perpendicular magnetic recording film is made of a material containing Co, Cr and Pt and also has a Cr content that is at least 14 at % and equal to or less than 24 at % (preferably at least 16 at % and equal to or less than 22 at %) and a Pt content that is at least 14 at % and equal to or less than 24 at % (preferably at least 15 at % and equal to or less than 20 at %).

The Cr content of less than 14 at % is not preferable for the following reason. That is, since exchange coupling between magnetic grains increases, and noise increases. The Cr content of more than 24 at % is not preferable because the ratio of residual magnetization (Mr) to saturation magnetization (Ms), Mr/Ms, is lowered.

The Pt content of less than 14 at % is not preferable because read/write characteristics become insufficient. The Pt content of less than 14 at % is not preferable because the ratio of residual magnetization (Mr) to saturation magnetization (Ms), Mr/Ms, is reduced and the thermal stability deteriorates. The Pt content of greater than 24 at % is not preferable because noise increases.

Orientation mainly in a perpendicular direction means that the coercive force Hc (P) in a perpendicular direction and the coercive force Hc (L) in an in-plane direction have the following relationship: Hc (P)>Hc (L).

The perpendicular magnetic recording film 5 preferably contains B, and the B content is preferably set to at least 0.1 at % and equal to or less than 5 at %.

Consequently, exchange coupling between magnetic grains can be reduced and read/write characteristics can be improved.

The perpendicular magnetic recording film 5 can be made of a CoCrPt alloy containing one or more selected from Ta, Mo, Nb, Hf, Ir, Cu, Ru, Nd, Zr, W and Nd.

It is particularly preferable to select the magnetic material used in the perpendicular magnetic recording film 5 from CoCrPtB alloys, CoCrPtTa alloys, CoCrPtTaCu alloys, CoCrPtBCu alloys, CoCrPtTaNd alloys, CoCrPtBNd alloys, CoCrPtBW alloys, CoCrPtBMo alloys, CoCrPtBRu alloys, CoCrPtTaW alloys, CoCrPtTaMo alloys, CoCrPtTaRu alloys, CoCrPtNd alloys, CoCrPtW alloys, CoCrPtMo alloys, CoCrPtRu alloys and CoCrPtCu alloys.

The perpendicular magnetic recording film 5 can be made of an alloy containing one or more selected from Zr, Re, V, Ni, Mn, Ge, Si, O and N added therein.

The perpendicular magnetic recording film 5 can have not only a single layer structure made of a single material for example, CoCrPt alloy, but also a structure comprising two or more layers.

For example, the perpendicular magnetic recording film 5 can have a multiple layer structure comprising a layer of Co alloys (CoCr, CoB, Co—SiO$_2$ and the like) and a layer of Pd alloys (PdB, Pd—SiO$_2$ and the like).

The perpendicular magnetic recording film 5 may have a multiple layer structure comprising a layer made of an amorphous material such as CoTb, CoNd or the like, and a layer made of CoCrPt materials.

It is also possible for a first perpendicular magnetic recording film made of CoCrPt alloy to be provided and a second perpendicular magnetic recording film made of CoCrPt alloy having a composition different from that of the materials used in the first perpendicular magnetic recording film to be provided thereon.

It is also possible for a first perpendicular magnetic recording film made of CoCrPt materials to be provided and a second perpendicular magnetic recording film comprising CoNd to be provided thereon.

The thickness of the perpendicular magnetic recording film 5 is preferably set from 7 to 60 nm (preferably from 10 to 40 nm).

When the thickness of the perpendicular magnetic recording film 5 is set to at least 7 nm, sufficient magnetic flux is obtained and the read back output is increased, thus making it possible to prevent the output waveform from being hardly conformed by the noise component. Therefore, it is made possible to obtain a magnetic read/write apparatus suitable for recording at a higher density.

When the thickness of the perpendicular magnetic recording film 5 is set to 60 nm or less, coarsening of magnetic grains in the perpendicular magnetic recording film 5 can be suppressed and deterioration of read/write characteristics, for example, increase of noise can be prevented.

The coercive force of the perpendicular magnetic recording film 5 is preferably set to at least 3000 (Oe). The magnetic recording medium having a coercive force of less than 3000 (Oe) is not preferable because resolution required to record at a higher density cannot be obtained and thermal stability deteriorates.

The ratio of residual magnetization (Mr) to saturation magnetization (Ms), Mr/Ms, of the perpendicular magnetic recording film 5 is set to at least 0.9. The magnetic recording medium having Mr/Ms of less than 0.9 is not preferable because it is inferior in thermal stability.

The negative nucleation field (−Hn) of the perpendicular magnetic recording film 5 is preferably at least 0 (Oe) and equal to or less than 2500 (Oe). The magnetic recording medium having the negative nucleation field (−Hn) of less than 0 (Oe) is not preferable because the thermal stability deteriorates.

The negative nucleation field (−Hn) of higher than 2500 (Oe) is not preferable because it makes magnetic separation of magnetic grains insufficient and enhances an activation magnetic moment (vIsb), resulting in increase of noise during reading/writing.

In the perpendicular magnetic recording film 5, the mean grain diameter of crystal grains is preferably from 5 to 15 nm. The mean grain diameter can be determined, for example, by observing crystal grains of the perpendicular magnetic recording film 5 by a transmission electron microscope (TEM) and image-processing the image observed.

ΔHc/Hc of the perpendicular magnetic recording film 5 is preferably equal to or less than 0.3. When ΔHc/Hc is equal to or less than 0.3, the grain diameter of magnetic grains varies slightly, and therefore the coercive force in the perpendicular direction of the perpendicular magnetic recording film 5 becomes more uniform.

Thus, it is made possible to prevent deterioration of read/write characteristics and thermal stability.

The intermediate film 4 and/or the perpendicular magnetic film 5 may have an initial growth portion as a bottom layer portion. This initial growth portion can have an amorphous structure.

The thickness of the initial growth portion is preferably set to 1 nm or less. The initial growth portion is a portion where crystal grains are not observed in the TEM image of the cross section.

In the present invention, it is preferable that the initial growth portion does not exist.

The protective film 6 is for preventing corrosion of the perpendicular magnetic recording film 5, and preventing damage to the medium surface when the magnetic head comes into contact with the medium. Conventionally known materials containing C, $SiO_2$, or $ZrO_2$ can be used for the protective film 6.

The thickness of the protective film 6 is preferably from 1 to 10 nm. In view of recording at a higher density, the distance between the magnetic head and the medium can be preferably reduced by setting the thickness within the above range.

It is preferable to use, as a lubricant film 7, perfluoropolyether, fluorinated alcohol, fluorinated carboxylic acid, or the like.

Next, an example of the method of manufacturing the magnetic recording medium having the above-described construction will be described.

On a non-magnetic substrate 1, a soft magnetic undercoat film 2 is formed by a sputtering method.

An oxidized layer can be formed on the surface of the soft magnetic undercoat film 2 by oxidizing the surface portion after forming the soft magnetic undercoat film 2.

The surface portion of the soft magnetic undercoat film 2 can be oxidized by a method of exposing the surface of the soft magnetic undercoat film 2 to a gas containing oxygen after forming the soft magnetic undercoat film 2, or a method that introduces oxygen into the process gas when forming the portion of the film at the surface of the soft magnetic undercoat film 2 can be used.

In the case in which the surface of the soft magnetic undercoat film 2 is exposed to an oxygen-containing gas, it can be employed a method to stand the substrate 1 on which the soft magnetic undercoat film 2 was formed in the oxygen-containing gas for about 0.3 to 20 seconds.

As the oxygen-containing gas, oxygen may be used, or a mixed gas of oxygen and another gas (argon, nitrogen or the like) may be used. Also, air can be used.

When using a mixed gas of oxygen and another gas, it becomes easy to control the degree of oxidization of the surface of the soft magnetic undercoat film 2 by controlling a mixing ratio.

In the case in which oxygen is introduced into a process gas, there can be employed a method of using a process gas containing oxygen introduced therein during only a portion of the film-forming time. As the process gas, for example, a gas obtained by mixing argon with about 0.05% to 50% by volume (preferably 0.1 to 20% by volume) of oxygen.

Next, on the soft magnetic undercoat film 2, an orientation control film 3 made of a Co alloy which contains one or more selected from Ti, V, Sr, Y, Nb, Mo, Hf, Ta, Ni and W is formed using a sputtering method.

An oxidized layer (or nitride layer) can be formed on the surface portion of the orientation control film 3 by oxidizing (or nitriding) the surface portion after forming the orientation control film 3.

The surface of the orientation control film 3 can be oxidized or nitrided by introducing oxygen or nitrogen into a process gas during the formation of the surface portion of the orientation control film 3.

As the process gas, a gas obtained by mixing argon with 0.05 to 50% by volume (preferably from 0.1 to 20% by volume) of oxygen, or a gas obtained by mixing argon with 0.01 to 20% by volume (preferably from 0.02 to 10% by volume) of nitrogen is preferably used.

Next, on the orientation control film 3, an intermediate film 4 and a perpendicular magnetic recording film 5 are formed by a sputtering method.

In the case in which a soft magnetic undercoat film 2, an orientation control film 3, an intermediate film 4 and a perpendicular magnetic recording film 5 are formed by a sputtering method, discharging is preferably conducted in the presence of a process gas such as Ar gas after setting the vacuum degree in a chamber within a range from $10^{-5}$ to $10^{-7}$ Pa.

The power applied to a target is preferably controlled within a range from 0.2 to 5 kW. A film having a desired thickness can be formed by controlling the discharge time and the power. In this case, the pressure of the process gas is preferably controlled within a range from 0.2 to 20 Pa, and more preferably from 0.3 to 10 Pa.

As the sputtering method, a DC or RF magnetron sputtering method can be employed.

When using an alloy material comprising two or more elements, an alloy target made of the alloy may be used as the target used in a sputtering method, or a sintered alloy target obtained by integrating two or more materials through sintering.

Next, a protective film 6 is formed by a plasma CVD method, an ion beam method, a sputtering method or the like.

A lubricant film 7 is formed by employing a conventionally known method (dipping method, spin coating method or the like).

In the magnetic recording medium of the present embodiment, since the orientation control film 3 is made of a Co alloy which contains one or more selected from Ti, V, Sr, Y, Nb, Mo, Hf, Ta, Ni and W, noise can be reduced, thereby improving read/write characteristics.

Therefore, it is made possible to read and write information at a higher density.

Figure 5:
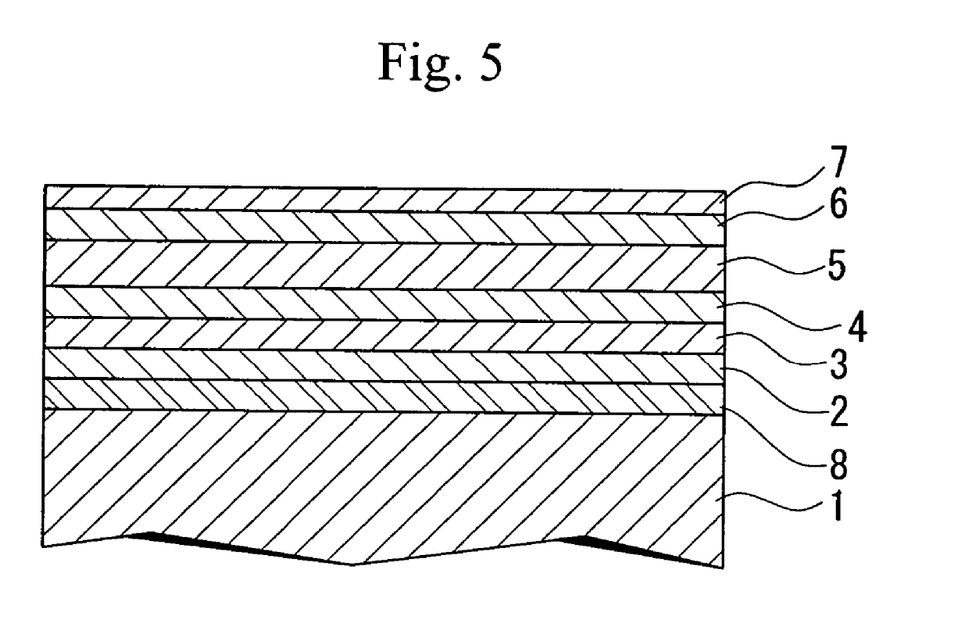
FIG. 5 is a partially sectional view showing the second embodiment of a magnetic recording medium of the present invention.

FIG. 5 shows the second embodiment of the magnetic recording medium of the present invention. In the embodiment, a hard magnetic film 8, of which magnetization anisotropy is mainly oriented in an in-plane direction is formed between a non-magnetic substrate 1 and a soft magnetic undercoat film 2.

It is preferable to use, in the hard magnetic film 8, a CoSm alloy or a $CoCrPtX_2$ alloy ($X_2$: one or more selected from Pt, Ta, Zr, Nb, Cu, Re, Ni, Mn, Ge, Si, O, N and B).

The coercive force Hc of the hard magnetic film 8 is preferably at least 500 (Oe) (preferably at least 1000 (Oe)).

The thickness of the hard magnetic film 8 is preferably equal to or less than 150 nm (preferably equal to or less than 70 nm). A thickness of more than 150 nm of the hard magnetic film 8 is not preferable because the mean surface roughness Ra of the orientation control film 3 becomes larger.

The hard magnetic film 8 is preferably provided with such a construction that exchange coupling between the hard magnetic film 8 and the soft magnetic undercoat film 2 is formed and the magnetic film 8 is magnetized in the radial direction of the substrate 1.

By providing the hard magnetic film 8, formation of large magnetic domains in the soft magnetic undercoat film 2 can be suppressed more effectively, and therefore the occurrence of spike noise due to magnetic domains can be prevented and the error rate during reading and writing can be sufficiently reduced.

To control the orientation of the hard magnetic film 8, an intermediate film made of a Cr alloy or a B2 structural material may be formed between a non-magnetic substrate 1 and a hard magnetic film 8.

Figure 6A:
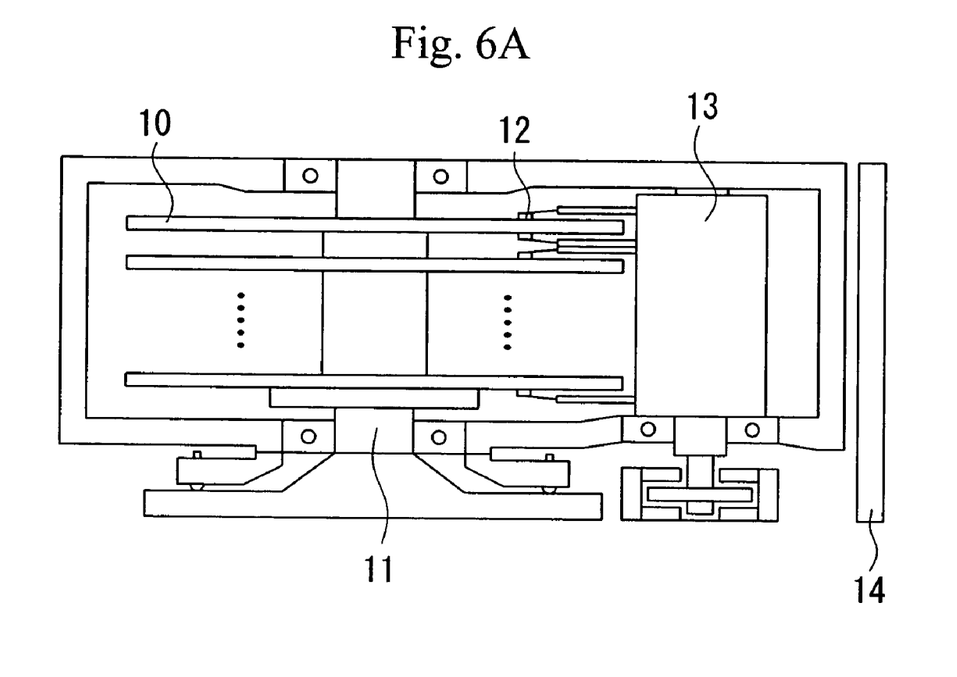
FIG. 6A is a schematic structural view showing an example of a magnetic read/write apparatus of the present invention.

FIG. 6 is a sectional structural view showing an example of the magnetic read/write apparatus according to the present invention. The magnetic read/write apparatus shown in this drawing comprises a magnetic recording medium 10, a medium drive unit 11 that rotates the magnetic recording medium 10, a magnetic head 12 that carries out reading and writing of the information on the magnetic recording medium 10, a head drive unit 13, and a read/write signal processing system 14. The read/write signal processing system 14 sends a read signal to the magnetic head 12 after processing the input data, and outputs the data after processing the write signal from the magnetic head 12.

Examples of the magnetic head 12 include a single pole type head for perpendicular recording.

Figure 6B:
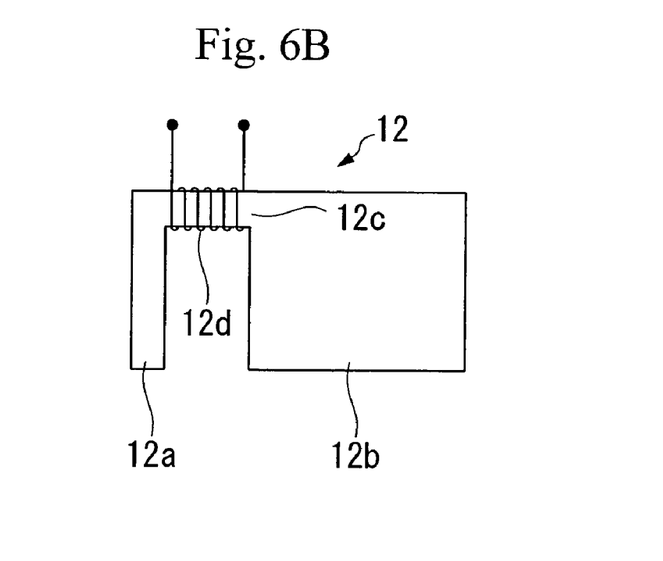
FIG. 6B shows a magnetic head used in the magnetic read/write apparatus shown in FIG. 6A.

As shown in FIG. 6B, as the single pole type head, a single pole type head with a construction comprising a main magnetic pole 12a, an auxiliary magnetic pole 12b and a coil 12d provided at a connection unit 12c that connects these magnetic poles can be preferably used.

According to the magnetic read/write apparatus described above, since the magnetic recording medium 10 is used, the read/write characteristics can be enhanced and high recording density can be increased.

The operational effect of the present invention will now be clarified by way of examples. However, the present invention is not limited to the following examples.

EXAMPLE 1

A washed glass substrate (Ohara Co. of JAPAN.; diameter: 2.5 inches (65 mm)) was accommodated in the film formation chamber of a DC magnetron sputtering apparatus (ANELVA of JAPAN, C-3010).

After expelling air in the film formation chamber up to an ultimate vacuum of $1 \times 10^{-5}$ Pa, a soft magnetic undercoat film 2 (thickness: 160 nm) comprising 89Co-4Zr-7Nb (Co content: 89 at %, Zr content: 4 at %, Nb content: 7 at %) was formed on the glass substrate 1 by a sputtering method.

As a result of the measurement using VSM, the product Bs·t of the saturation magnetic density Bs of the soft magnetic undercoat film 2 and the thickness t was 200 T·nm.

After heating the substrate 1 on which the soft magnetic undercoat film 2 was formed to 240° C., an orientation control film 3 (thickness: 5 nm) comprising 50Co-50W was formed on the soft magnetic undercoat film 2 using a sputtering method.

Saturation magnetization Ms of the orientation control film 3 was 0 emu/cc.

Next, an intermediate film 4 (thickness: 10 nm) comprising 65Co-30Cr-5B (Co content: 65 at %, Cr content: 30 at %, B content: 5 at %) was formed using a sputtering method. It was confirmed by the TEM image that the thickness of the initial growth portion of the intermediate film 4 was 0.5 nm.

Next, a perpendicular magnetic recording film 5 (thickness: 20 nm) comprising 64Co-17Cr-17Pt-2B (Co content: 64 at %, Cr content: 17 at %, Pt content: 17 at %, B content: 2 at %) was formed using a sputtering method.

In the respective sputtering processes described above, an argon gas as a process gas for film formation is used. The pressure of the process gas was controlled to 0.6 Pa.

Next, a protective film 6 (thickness: 5 nm) was formed by a CVD method.

Next, a lubrication film 7 made of perfluoropolyether was formed by a dip coating method to obtain a magnetic recording medium (see Table 1).

COMPARATIVE EXAMPLES 1 TO 3

In the same manner as in Example 1, except that each material shown in Table 1 was used for the orientation control film 3, magnetic recording media were manufactured (see Table 1).

With respect to magnetic recording media of these Examples and Comparative Example, read/write characteristics were evaluated. The evaluation was conducted using a read write analyzer RWA1632 and a spin stand S1701MP manufactured by GUZIK Co. of the U.S.

In the evaluation of read/write characteristics, measurement was conducted at a recording frequency of 600 kFCI using a magnetic head wherein a single magnetic pole head was used at the write portion and a GMR element was used at the read back portion. The obtained test results are shown in Table 1.

TABLE 1

| | SOFT MAGNETIC UNDERCOAT FILM | | ORIENTATION CONTROL FILM | | INTERMEDIATE FILM | |
|---|---|---|---|---|---|---|
| | COMPOSITION (at %) | Bs · t (T · nm) | COMPOSITION (at %) | THICKNESS (nm) | COMPOSITION (at %) | THICKNESS (nm) |
| Example 1 | CoZrNb | 200 | 50Co—50W | 5 | 65Co—30Cr—5B | 10 |
| Comparative Example 1 | CoZrNb | 200 | 65Ni—35Ta | 5 | 65Co—30Cr—5B | 10 |
| Comparative Example 2 | CoZrNb | 200 | 60Ru—40Co | 15 | 65Co—30Cr—5B | 10 |
| Comparative Example 3 | CoZrNb | 200 | C | 5 | 65Co—30Cr—5B | 10 |

| | PERPENDICULAR MAGNETIC FILM | | READ/WRITE CHARACTERISTICS | | | |
|---|---|---|---|---|---|---|
| | COMPOSITION (at %) | THICKNESS (nm) | ERROR RATE ($10^x$) | Hc (Oe) | Mr/Ms | −Hn (Oe) |
| Example 1 | 64Co—17Cr—17Pt—2B | 20 | −5.5 | 4255 | 1.00 | 500 |
| Comparative Example 1 | 64Co—17Cr—17Pt—2B | 20 | −4.1 | 4250 | 1.00 | 400 |
| Comparative Example 2 | 64Co—17Cr—17Pt—2B | 20 | −3.2 | 3590 | 0.77 | *** |
| Comparative Example 3 | 64Co—17Cr—17Pt—2B | 20 | −2.1 | 3760 | 0.88 | 100 |

As is apparent from Table 1, the Examples wherein the orientation control film 3 is made of a Co alloy containing W exhibited excellent read/write characteristics as compared with the Comparative Examples.

EXAMPLES 2 TO 17

In the same manner as in Example 1, except for selecting the composition of the orientation control film 3 as shown in Table 2, magnetic recording media were manufactured.

With respect to magnetic recording media of these Examples, read/write characteristics were evaluated. The test results are shown in Table 2.

TABLE 2

| | SOFT MAGNETIC UNDERCOAT FILM | | ORIENTATION CONTROL FILM | | INTERMEDIATE FILM |
|---|---|---|---|---|---|
| | COMPOSITION (at %) | Bs · t (T · nm) | COMPOSITION (at %) | THICKNESS (nm) | COMPOSITION (at %) |
| Example 1 | CoZrNb | 200 | 50Co—50W | 5 | 65Co—30Cr—5B |
| Example 2 | CoZrNb | 200 | 50Co—50Ti | 5 | 65Co—30Cr—5B |
| Example 3 | CoZrNb | 200 | 60Co—40V | 5 | 65Co—30Cr—5B |
| Example 4 | CoZrNb | 200 | 60Co—40Sr | 5 | 65Co—30Cr—5B |
| Example 5 | CoZrNb | 200 | 40Co—60Y | 5 | 65Co—30Cr—5B |
| Example 6 | CoZrNb | 200 | 30Co—70Nb | 5 | 65Co—30Cr—5B |
| Example 7 | CoZrNb | 200 | 40Co—60Mo | 5 | 65Co—30Cr—5B |
| Example 8 | CoZrNb | 200 | 50Co—50Hf | 5 | 65Co—30Cr—5B |
| Example 9 | CoZrNb | 200 | 35Co—65Ta | 5 | 65Co—30Cr—5B |
| Example 10 | CoZrNb | 200 | 20Co—80W | 5 | 65Co—30Cr—5B |
| Example 11 | CoZrNb | 200 | 25Co—75W | 5 | 65Co—30Cr—5B |
| Example 12 | CoZrNb | 200 | 70Co—30W | 5 | 65Co—30Cr—5B |
| Example 13 | CoZrNb | 200 | 85Co—15W | 5 | 65Co—30Cr—5B |
| Example 14 | CoZrNb | 200 | 40Co—40W—20Mo | 5 | 65Co—30Cr—5B |
| Example 15 | CoZrNb | 200 | 40Co—40W—20B | 5 | 65Co—30Cr—5B |
| Example 16 | CoZrNb | 200 | 40Co—40W—20Cr | 5 | 65Co—30Cr—5B |
| Example 17 | CoZrNb | 200 | 40Co—40W—20Ni | 5 | 65Co—30Cr—5B |

TABLE 2-continued

|  | INTERMEDIATE FILM | PERPENDICULAR MAGNETIC FILM | | READ/WRITE CHARACTERISTICS |
|---|---|---|---|---|
|  | THICKNESS (nm) | COMPOSITION (at %) | THICKNESS (nm) | ERROR RATE ($10^x$) |
| Example 1 | 10 | 64Co—17Cr—17Pt—2B | 20 | −5.5 |
| Example 2 | 10 | 64Co—17Cr—17Pt—2B | 20 | −5.1 |
| Example 3 | 10 | 64Co—17Cr—17Pt—2B | 20 | −5.2 |
| Example 4 | 10 | 64Co—17Cr—17Pt—2B | 20 | −5.3 |
| Example 5 | 10 | 64Co—17Cr—17Pt—2B | 20 | −5.1 |
| Example 6 | 10 | 64Co—17Cr—17Pt—2B | 20 | −5.2 |
| Example 7 | 10 | 64Co—17Cr—17Pt—2B | 20 | −5.3 |
| Example 8 | 10 | 64Co—17Cr—17Pt—2B | 20 | −5.1 |
| Example 9 | 10 | 64Co—17Cr—17Pt—2B | 20 | −5.2 |
| Example 10 | 10 | 64Co—17Cr—17Pt—2B | 20 | −4.9 |
| Example 11 | 10 | 64Co—17Cr—17Pt—2B | 20 | −5.3 |
| Example 12 | 10 | 64Co—17Cr—17Pt—2B | 20 | −5.4 |
| Example 13 | 10 | 64Co—17Cr—17Pt—2B | 20 | −5.1 |
| Example 14 | 10 | 64Co—17Cr—17Pt—2B | 20 | −5.5 |
| Example 15 | 10 | 64Co—17Cr—17Pt—2B | 20 | −5.5 |
| Example 16 | 10 | 64Co—17Cr—17Pt—2B | 20 | −5.6 |
| Example 17 | 10 | 64Co—17Cr—17Pt—2B | 20 | −5.3 |

As is apparent from Table 2, the Examples wherein the orientation control film 3 made of a Co alloy containing one or more selected from Ti, V, Sr, Y, Nb, Mo, Hf, Ta, Ni and W exhibited read/write characteristics.

Also the Examples wherein the Co content is at least 20 at % and equal to or less than 85 at % (particularly at least 25 at % and equal to or less than 70 at %) exhibited excellent characteristics.

EXAMPLES 18 TO 21

In the same manner as in Example 1, except for selecting the thickness of the orientation control film 3 as shown in Table 3, magnetic recording media were manufactured.

With respect to magnetic recording media of these Examples, read/write characteristics were evaluated. The test results are shown in Table 3.

As is apparent from Table 3, the Examples wherein the thickness of the orientation control film 3 was at least 0.5 nm and equal to or less than 20 nm exhibited excellent read/write characteristics.

EXAMPLE 22

In the same manner as in Example 1, except for forming no intermediate film 4, magnetic recording media were manufactured.

EXAMPLES 23 AND 24

In the same manner as in Example 1, except for selecting the composition of the intermediate film 4 as shown in Table 4, magnetic recording media were manufactured.

TABLE 3

|  | SOFT MAGNETIC UNDERCOAT FILM | | ORIENTATION CONTROL FILM | | INTERMEDIATE FILM |
|---|---|---|---|---|---|
|  | COMPOSITION (at %) | Bs · t (T · nm) | COMPOSITION (at %) | THICKNESS (nm) | COMPOSITION (at %) |
| Example 1 | CoZrNb | 200 | 50Co—50W | 5 | 65Co—30Cr—5B |
| Example 18 | CoZrNb | 200 | 50Co—50W | 0.8 | 65Co—30Cr—5B |
| Example 19 | CoZrNb | 200 | 50Co—50W | 10 | 65Co—30Cr—5B |
| Example 20 | CoZrNb | 200 | 50Co—50W | 18 | 65Co—30Cr—5B |
| Example 21 | CoZrNb | 200 | 50Co—50W | 30 | 65Co—30Cr—5B |

|  | INTERMEDIATE FILM | PERPENDICULAR MAGNETIC FILM | | READ/WRITE CHARACTERISTICS |
|---|---|---|---|---|
|  | THICKNESS (nm) | COMPOSITION (at %) | THICKNESS (nm) | ERROR RATE ($10^x$) |
| Example 1 | 10 | 64Co—17Cr—17Pt—2B | 20 | −5.5 |
| Example 18 | 10 | 64Co—17Cr—17Pt—2B | 20 | −5.0 |
| Example 19 | 10 | 64Co—17Cr—17Pt—2B | 20 | −5.3 |
| Example 20 | 10 | 64Co—17Cr—17Pt—2B | 20 | −5.0 |
| Example 21 | 10 | 64Co—17Cr—17Pt—2B | 20 | −4.8 |

With respect to magnetic recording media of these Examples, read/write characteristics were evaluated. The test results are shown in Table 4.

TABLE 4

| | SOFT MAGNETIC UNDERCOAT FILM | | ORIENTATION CONTROL FILM | | INTERMEDIATE FILM |
|---|---|---|---|---|---|
| | COMPOSITION (at %) | Bs · t (T · nm) | COMPOSITION (at %) | THICKNESS (nm) | COMPOSITION (at %) |
| Example 1 | CoZrNb | 200 | 50Co—50W | 8 | 65Co—30Cr—5B |
| Example 22 | CoZrNb | 200 | 50Co—50W | 8 | — |
| Example 23 | CoZrNb | 200 | 50Co—50W | 8 | 60Co—30Cr—10Pt |
| Example 24 | CoZrNb | 200 | 50Co—50W | 8 | 60Co—25Cr—10Ptr—5B |

| | INTERMEDIATE FILM | PERPENDICULAR MAGNETIC FILM | | READ/WRITE CHARACTERISTICS |
|---|---|---|---|---|
| | THICKNESS (nm) | COMPOSITION (at %) | THICKNESS (nm) | ERROR RATE ($10^x$) |
| Example 1 | 10 | 64Co—17Cr—17Pt—2B | 20 | −5.5 |
| Example 22 | — | 64Co—17Cr—17Pt—2B | 20 | −4.6 |
| Example 23 | 10 | 64Co—17Cr—17Pt—2B | 20 | −5.4 |
| Example 24 | 10 | 64Co—17Cr—17Pt—2B | 20 | −5.9 |

As is apparent from Table 4, the Examples wherein the intermediate film 4 was formed exhibited excellent read/write characteristics. In particular, the Examples wherein the intermediate film 4 made of a CoCrPtB alloy was formed exhibited excellent characteristics.

The invention claimed is:

1. A magnetic recording medium comprising, on a non-magnetic substrate,
at least a soft magnetic undercoat film,
an orientation control film that controls the orientation of a film provided directly above,
a perpendicular magnetic film having an axis of easy magnetization generally oriented perpendicular to said substrate,
and a protective film,
wherein the orientation control film is made of a Co alloy which contains W and the Co content of the orientation control film is at least 20 at % and equal to or less than 85 at %.

2. The magnetic recording medium according to claim 1, wherein saturation magnetization Ms of the orientation control film is equal to or less than 200 emu/cc.

3. The magnetic recording medium according to claim 1, wherein the thickness of the orientation control film is at least 0.5 nm and equal to or less than 20 nm.

4. The magnetic recording medium according to claim 1, wherein the orientation control film has an amorphous structure.

5. The magnetic recording medium according to claim 1, wherein an intermediate film made of a material containing at least Co and Cr is provided between the orientation control film and the perpendicular magnetic film.

6. The magnetic recording medium according to claim 5, wherein the intermediate film is made of a CoCrPtB alloy.

7. The magnetic recording medium according to claim 5, wherein the intermediate film has an amorphous initial growth portion and the thickness of the initial growth portion of the intermediate film having an amorphous structure is equal to or less than 1 nm.

8. The magnetic recording medium according to claim 1, wherein the perpendicular magnetic film is made of a material containing at least Co and Pt.

9. A method of manufacturing a magnetic recording medium, comprising:
forming at least a soft magnetic undercoat layer, an orientation control film that controls the orientation of a film provided directly above, a perpendicular magnetic film having an axis of easy magnetization generally oriented perpendicular to a non-magnetic substrate, and a protective film, on the non-magnetic substrate, wherein
the orientation control film is made of a Co alloy which contains W and the Co content of the orientation control film is at least 20 at % and equal to or less than 85 at %.

10. A magnetic read/write apparatus comprising a magnetic recording medium and a magnetic head that reads and writes information on the magnetic recording medium, wherein
the magnetic head is a single pole head, and
the magnetic recording medium comprises at least a soft magnetic undercoat film, an orientation control film that controls the orientation of a film provided directly above, a perpendicular magnetic film having an axis of easy magnetization generally oriented perpendicular to a non-magnetic substrate, and a protective film, that are provided on the non-magnetic substrate, the orientation control film being made of Co alloy which contains W and the Co content of the orientation control film is at least 20 at % and equal to or less than 85 at %.

11. A magnetic recording medium comprising, on a non-magnetic substrate:
at least a soft magnetic undercoat film,
an orientation control film that controls the orientation of a film provided directly above,
an intermediate film;
a perpendicular magnetic film having an axis of easy magnetization generally oriented perpendicular to said substrate,
and a protective film,
wherein the orientation control film is made of a Co alloy which contains one or more selected from Ti, V, Sr, Y, Nb, Mo, Hf, Ta, Ni and W, and wherein the intermediate film, made of a material containing at least Co and Cr, is provided between the orientation control film and the perpendicular magnetic film and the intermediate film is in direct contact with the orientation control film.

12. A magnetic recording medium comprising, on a non-magnetic substrate:
   at least a soft magnetic undercoat film,
   an orientation control film that controls the orientation of a film provided directly above,
   an intermediate film;
   a perpendicular magnetic film having an axis of easy magnetization generally oriented perpendicular to said substrate,
   and a protective film,
   wherein the orientation control film is made of a Co alloy which contains one or more selected from Ti, V, Sr, Y, Nb, Mo, Hf, Ta, Ni and W, and
   wherein the intermediate film, made of a material containing at least Co and Cr, is provided between the orientation control film and the perpendicular magnetic film, is in direct contact with the orientation control film, has an amorphous initial growth portion, and the thickness of the initial growth portion of the intermediate film having an amorphous structure is equal to or less than 1 mm.

13. A magnetic recording medium according to claim 1, wherein the Co content of the orientation content film is 50 at % or less.

14. A method of manufacturing a magnetic recording medium according to claim 9 wherein the Co content of the orientation film is 50 at % or less.

15. A magnetic read/write apparatus according to claim 10 wherein the Co content of the orientation film is 50 at % or less.

* * * * *